US010634564B2

(12) United States Patent
Litteaur et al.

(10) Patent No.: US 10,634,564 B2
(45) Date of Patent: Apr. 28, 2020

(54) MINERAL INSULATED SHEATHED ASSEMBLY WITH GROUNDED AND UNGROUNDED TEMPERATURE SENSORS

(71) Applicant: Daily Thermetrics Corporation, Houston, TX (US)

(72) Inventors: Raymond B. Litteaur, Houston, TX (US); Jeffrey N. Daily, Houston, TX (US)

(73) Assignee: Daily Thermetrics Corporation, Houston, TX (US)

( * ) Notice: Subject to any disclaimer, the term of this patent is extended or adjusted under 35 U.S.C. 154(b) by 0 days.

(21) Appl. No.: 16/372,126

(22) Filed: Apr. 1, 2019

(65) Prior Publication Data
US 2019/0226916 A1   Jul. 25, 2019

Related U.S. Application Data

(60) Division of application No. 15/236,079, filed on Aug. 12, 2016, now Pat. No. 10,288,490, which is a
(Continued)

(51) Int. Cl.
*G01K 7/00* (2006.01)
*G01K 1/00* (2006.01)
(Continued)

(52) U.S. Cl.
CPC .............. *G01K 1/08* (2013.01); *G01K 7/06* (2013.01); *G01K 7/16* (2013.01); *G01K 15/007* (2013.01)

(58) Field of Classification Search
USPC ........................ 374/179, 208, 166, 110, 43
See application file for complete search history.

(56) References Cited

U.S. PATENT DOCUMENTS 3,232,794 A * 2/1966 Korton .................. G01K 7/04
136/233
3,923,552 A 12/1975 Parris
(Continued)

FOREIGN PATENT DOCUMENTS

JP   10-325759 A   12/1998

OTHER PUBLICATIONS

International Search Report issued in connection with International patent application No. PCT/US2017/046492, dated Nov. 22, 2017, 3 pages.

*Primary Examiner* — Mirellys Jagan
(74) *Attorney, Agent, or Firm* — Duane Morris LLP; Diana M. Sangalli

(57) ABSTRACT

A temperature sensing assembly includes first and second temperature sensors disposed within an elongate mineral insulated conductive sheath. A junction point of the first temperature sensor is electrically connected to the conductive sheath. The second temperature sensor is electrically isolated from the conductive sheath. Measurements obtained from the electrically isolated temperature sensor can be used to test insulation resistance of the assembly or temperature indications from the electrically isolated temperature sensor can be compared to measurements taken from the electrically connected junction point to take a variety of corrective actions during use of the temperature sensing assembly, such as adjusting the installation of the assembly or applying correction factors to measurements obtained from one of the temperature sensors.

5 Claims, 3 Drawing Sheets

Related U.S. Application Data continuation-in-part of application No. 15/152,398, filed on May 11, 2016, now Pat. No. 10,295,491.

(51) Int. Cl.
*G01K 3/00* (2006.01)
*G01N 25/00* (2006.01)
*G01K 1/08* (2006.01)
*G01K 7/16* (2006.01)
*G01K 15/00* (2006.01)
*G01K 7/06* (2006.01)

(56) References Cited

U.S. PATENT DOCUMENTS

| | | |
|---|---|---|
| 4,183,248 A | 1/1980 | West |
| 5,158,366 A | 10/1992 | Nagai |
| 6,536,950 B1 | 3/2003 | Green |
| 8,911,148 B2 | 12/2014 | Martensson |
| 2007/0258506 A1 | 11/2007 | Schwagerman et al. |
| 2011/0224907 A1 | 9/2011 | Chalifoux |
| 2013/0070808 A1 | 3/2013 | Daily et al. |
| 2013/0243035 A1 | 9/2013 | Walling |
| 2016/0178448 A1 | 6/2016 | Mella |
| 2016/0252404 A1 | 9/2016 | Terada |

* cited by examiner

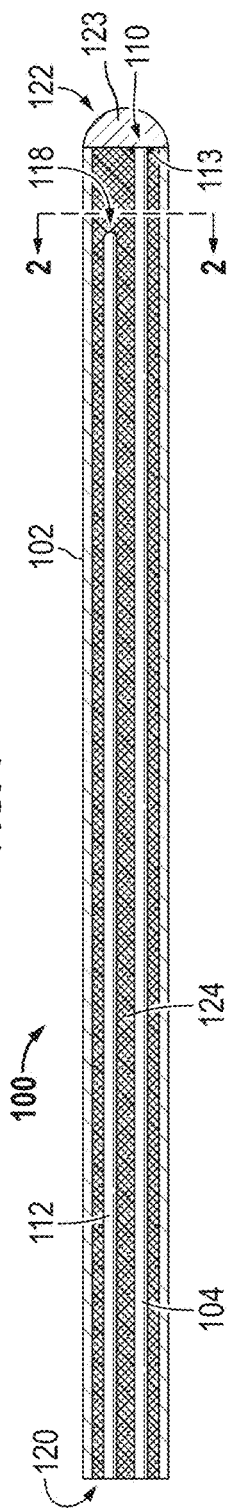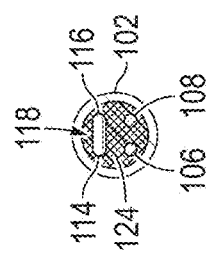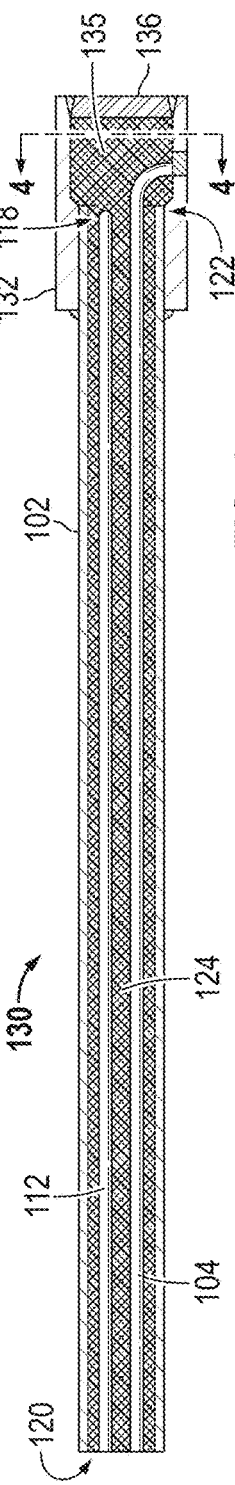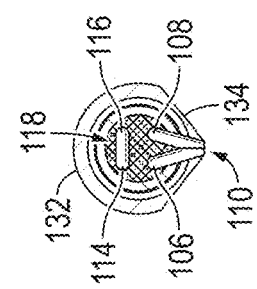

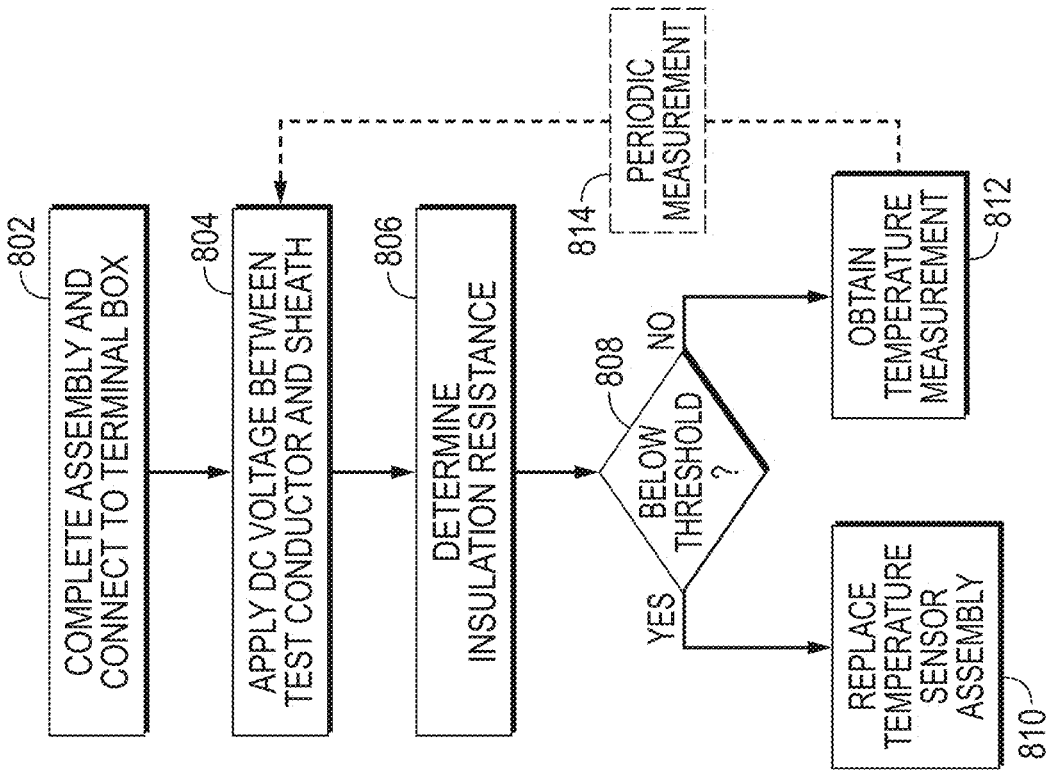
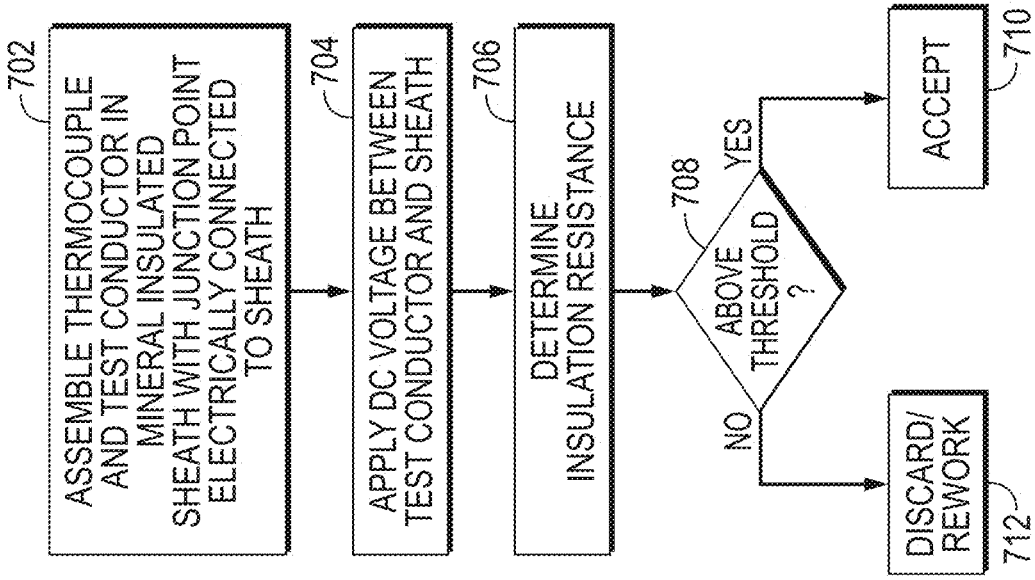

MINERAL INSULATED SHEATHED ASSEMBLY WITH GROUNDED AND UNGROUNDED TEMPERATURE SENSORS

RELATED APPLICATIONS

This application is a division of U.S. patent application Ser. No. 15/236,079, filed Aug. 12, 2016, which is a continuation-in-part of U.S. application Ser. No. 15/152,398, filed May 11, 2016, both of which are herein fully incorporated by reference.

TECHNICAL FIELD

The present invention relates generally to mineral insulated sheathed assemblies, such as temperature sensing assemblies, and, more particularly, to a mineral insulated sheathed assembly having a grounded sensor and an ungrounded sensor contained within a conductive sheath.

BACKGROUND

A variety of temperature sensors can be used in environments that require the temperature sensor to be contained within a protective sheath. For example, the temperature sensors can be used in applications, such as high temperature and/or high pressure processes, that require that the sensor be protected to some degree from the extreme environment. In some applications, the protective sheath is made of a conductive material that is electrically grounded in the setup in which the temperature sensor is deployed. In many setups, the temperature sensor is configured as a thermocouple with a junction point that also is electrically grounded, thereby providing the ability to make a direct measurement of temperature. For example, the thermocouple can be electrically grounded by electrically coupling the thermocouple to the conductive sheath. The sheath is filled with an electrically insulative material to isolate the conductors making up the thermocouple from each other and from the inner wall of the sheath (except for the junction point). However, because the junction point is grounded to the sheath, a measure of the insulation resistance of the temperature sensor (i.e., a measure of the integrity of the electrically insulative material isolating the conductors from each other and from the inner wall of the sheath) cannot be made. Accordingly, an imminent failure of the temperature sensor may go undetected until the sensor actually fails. Inaccuracies in temperature measurements also may go undetected. As an example, a welding operation performed in the vicinity where the temperature sensor is installed can interfere electrically with the measurement made by a grounded sensor.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 1 is a schematic representation of a cross-section of an exemplary temperature sensing assembly according to an embodiment.

FIG. 2 is a cross-section taken along the line 2-2 of FIG. 1.

FIG. 3 is a schematic representation of a cross-section of an exemplary temperature sensing assembly according to another embodiment;

FIG. 4 is a cross-section taken along the line 4-4 of FIG. 3.

FIG. 7 is a diagram illustrating an exemplary procedure for assembling and testing insulation resistance of a temperature sensing assembly according to an embodiment.

FIG. 8 is a diagram illustrating an exemplary procedure for deploying a temperature sensing assembly and testing insulation resistance during use according to an embodiment.

DETAILED DESCRIPTION

Figure 5:
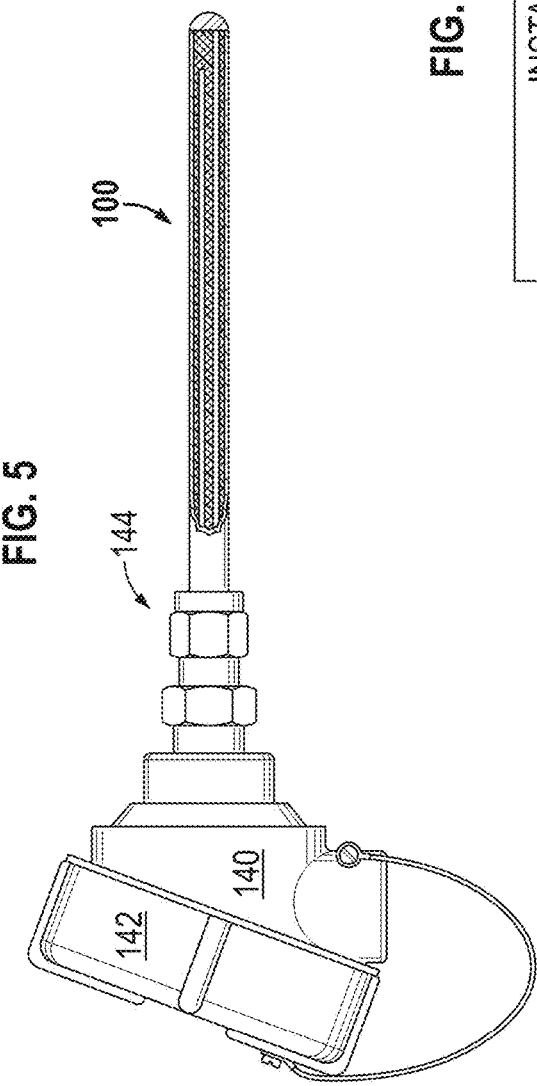
FIG. 5 illustrates the temperature sensing assembly of FIG. 1 connected to an exemplary terminal box according to an embodiment.

Embodiments of the invention provide a temperature sensing assembly disposed within a conductive sheath. The temperature sensing assembly includes a first thermocouple with a grounded junction point to provide a first indication of temperature and an electrically insulative material surrounding the conductors disposed within the sheath that make up the thermocouple. The assembly further includes a second thermocouple disposed within the sheath and having a junction point that is electrically isolated from the sheath. The second thermocouple can be used to provide an indication of the insulation resistance of the assembly and/or a second indication of temperature. Depending on the application in which temperature sensing assembly is deployed, either or both of the first and second thermocouples can be used to measure temperature. The temperature measurements from the first and second thermocouples also can be compared to provide an indication of their accuracy and/or errors or to provide an indication of whether the temperature sensing assembly has been properly installed, as will be described in further detail below.

An example of a sheathed temperature sensing assembly 100 according to one embodiment is shown schematically in the cross-section view of FIG. 1. The assembly 100 includes a sheath 102 made of a conductive material (e.g., stainless steel, Inconel, nickel alloy), a first temperature sensor 104 that is grounded and a second temperature sensor 112 that is ungrounded. In FIG. 1, the grounded sensor 104 is a thermocouple made of a pair of electrical conductors 106, 108 of dissimilar materials, such as iron/constantin, chromel/alumel, copper/constantan, joined at a temperature sensing junction 110. The ungrounded sensor 112 also is a thermocouple made of a pair of electrical conductors 114, 116 made of dissimilar materials joined at a temperature sensing junction 118. In other embodiments, the ungrounded temperature sensor 112 can be configured as a resistance temperature detector (or RTD) or any other type of suitable temperature sensor.

The sheath 102 comprises an open interior into which the pairs of electrical conductors 106, 108 and 114, 116 extend through an open end 120 to a distal end 122. In the embodiment of FIG. 1, the electrical conductors 106, 108 extend along the length of the sheath 102 and are joined to form the sensing junction 110 at the distal end 122 of the sheath 102. In the embodiment shown, an end cap 123 encloses the distal end 122 of the sheath 102. The end cap 123 can be made of the same electrically conductive material as the sheath 102 and can be attached to the distal end 122 such as by welding. The junction 110 is electrically connected to the sheath 102, such as by a weld 113 at the end cap 123, so that, in use, both the junction 110 and the sheath 102 are at the same electrical potential. Generally, in use, the junction 110 and the sheath 102 are electrically grounded. The electrical conductors 114, 116 also extend along the length of the sheath 102 and terminate at the junction 118 at a location along the length of the sheath 102. The junction 118 is electrically isolated from the sheath 102 so that it is an ungrounded junction.

Although FIG. 1 shows the grounded junction 110 at the distal end 122 of the sheath 102, it should be understood that the junction 110 can be located at any desired position along the length of the sheath 102. Further, although ungrounded junction 118 is shown in close proximity to junction 110, it should be understood that junction 118 can be located at any desired position along the length of the sheath 102 either proximate to or far removed from junction 110. Further, although only two conductor pairs 106, 108 and 114, 116 are shown, more than two conductor pairs with either grounded or ungrounded junction points can be included within the sheath 102.

An insulation material 124, such as an electrical insulation material, is disposed about the individual conductors 106, 108, 114, 116 contained within the sheath 102. The insulation material 124 generally fills the interior about each of the conductors 106, 108, 114, 116 of the temperature sensors 104, 112. Although various electrical insulation materials may be used, exemplary materials are magnesium oxide (MgO) and alumina oxide. The insulation material 124 electrically isolates each of the conductors 106, 108, 114, 116 from the others and from the inside wall of the sheath 102 except at the junction point 110. The insulation material 124 also electrically isolates the junction point 118 from the inside wall of the sheath 102. Maintaining the electrical isolation between conductors 106, 108, 114, 116 and the sheath 102 (except at the junction point 110) helps ensure that the temperature measurements provided by the junction points 110 and 118 are accurate, reliable and will not drift.

FIG. 2 shows a cross section of the temperature sensing assembly 100 taken generally along the line 2-2 of FIG. 1, showing the conductor pair 106, 108, the conductor pair 114, 116 and the junction point 118 disposed within the interior space of the sheath 102. The conductor pairs 106, 108 and 114, 116 and the junction point 118 are surrounded by the insulative material 124.

FIG. 3 schematically illustrates a cross section of another example of a sheathed temperature sensing assembly 130 according to an embodiment. The assembly 130 includes the conductive sheath 102, the first temperature sensor 104 made of the pair of electrical conductors 106, 108, and the second temperature sensor 112 made of the pair of electrical conductors 114, 116 joined at the temperature sensing junction 118. The pairs of electrical conductors 106, 108 and 114, 116 extend through the open end 120 of the sheath 102 to the distal end 122. The interior space of the sheath 102 is filled with the electrically insulative material 124.

In the embodiment of FIG. 3, the sheath 102 is coupled (e.g., welded) to a mounting pad 132 that is shaped so that it can be engaged with a complementary mounting feature associated with a high temperature structure that is to be monitored for temperature. As an example, the structure can be a pipe (e.g., a furnace tube) or the outer wall of a high temperature vessel. A mounting feature can be coupled (e.g., welded) to the outer surface of the pipe of the outer wall of the vessel for receiving the temperature sensing assembly 130. In this manner, the temperature sensing assembly 130 can be removably attached to the high temperature structure. In the embodiment shown in FIG. 3, the mounting pad 132 generally has a V-shaped cross section and a bottom part 134 of the "V" is configured so that it can be placed in the close proximity to the surface of the structure to be monitored. The mounting pad 132 is made of an electrical conductive material so that it also is electrically connected to the sheath 102.

As shown in FIG. 3, the electrical conductors 106, 108 extend along the length of the sheath 102 and are joined to form the sensing junction 110 that extends beyond the distal end 122 of the sheath 102. In this embodiment, the junction point 110 is connected to the bottom part 134 of the V-shaped cross section of the mounting pad 132 so that the junction point 110 will be in close proximity to the surface of the structure to be monitored. The interior space of the mounting pad 132 is filled with an electrically insulative material 135, such as the same material that fills the interior of the sheath 102. The interior space of the mounting pad 132 is enclosed by an end cap 136, such as by welding cap 136 to the mounting pad 132. The junction 110 thus is electrically connected to the sheath 102, so that, in use, both the junction 110 and the sheath 102 are at the same electrical potential. Generally, in use, the junction 110 and the sheath 102 are electrically grounded. The electrical conductors 114, 116 also extend along the length of the sheath 102 and terminate at the junction 118 at a location along the length of the sheath 102. The junction 118 is electrically isolated from the sheath 102

FIG. 4 shows a cross section of the temperature sensing assembly 130 taken generally along the line 4-4 of FIG. 3, showing the conductor pair 106, 108, the conductor pair 114, 116 and the junction point 118 disposed within the interior space of the sheath 102 and the junction point 110 extending from the distal end 122 of the sheath and connected to the mounting pad 132.

In many applications in which temperature sensing assemblies are used, the application requires that the sensing point of the thermocouple must be grounded. If the junction is grounded, then a measurement of insulation resistance cannot be made. However, in the embodiments shown in FIGS. 1-4, the presence of the ungrounded temperature sensor 112 enables the insulation resistance of the temperature sensing assemblies 100 and 130 to be measured both at the time of manufacture and while in use in the field.

When deployed in the application in which the temperature measurements are made, the conductors 106, 108, 114, 116 within the sheath 102 are connected to a terminal box 140 or other suitable arrangement that provides ready access to apply and/or measure electrical signals present on the conductors 106, 108, 114, 116. As shown in FIG. 5, an exemplary terminal box 140 with an access cover 142 can be coupled to the sheath 102 of the assembly 100 through an appropriate mechanical coupling 144 and each of the conductors 106, 108, 114, 116 extends from the open end 120 of the sheath 102 and is connected to terminals 146, 148, 150, 152 that are accessible to an operator of the temperature sensing assembly 100. Although assembly 100 is shown in FIG. 5, it should be understood that the terminal box 140 also can be used with the assembly 130 or any other temperature sensing assembly having both grounded and ungrounded temperature sensors.

Figure 6:
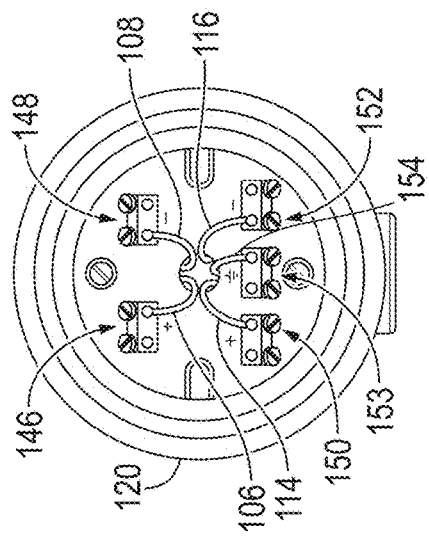
FIG. 6 is a schematic representation of a face of the terminal box showing the connection terminals according to an embodiment.

The face of the exemplary terminal box 140 is shown schematically in FIG. 6, which includes the pair of terminals 146, 148 electrically connected to the conductor pair 106, 108 of the grounded temperature sensor; the pair of terminals 150, 152 electrically connected to the conductor pair 114, 116 of the ungrounded temperature sensor; and a terminal 153 that is electrically grounded. For example, the terminal 153 can be electrically grounded via a conductor 154 that can be directly connected to sheath 102. Alternatively, the terminal 153 can be grounded through an electrical connection to the sheath 102, such as by a connection to an electrically conductive transition housing.

The presence of both grounded and ungrounded temperature sensors 104, 112 in the mineral insulated sheath provides a number of benefits when the assembly 100, 130 is installed. For example, concurrent temperature measurements can be made using both sensors 104, 112 and the measurement made by the ungrounded sensor 112 can be used as a control to confirm the accuracy of the measurement obtained from the grounded sensor 104. Similarly, in an application that calls for use of an ungrounded sensor, then the measurement obtained from the grounded sensor 104 can be used to show errors or drifting that can occur over time in the measurements obtained from the ungrounded sensor 112. As yet another example, the measurements obtained from the grounded sensor 104 and the ungrounded sensor 112 can be compared to confirm that the installation of the temperature sensing assembly 100, 130 has been properly performed. For example, comparing the measurements provides an indication of whether the mounting pad 132 of assembly 130 has been properly engaged with a complementary mounting feature in the installation. If properly engaged, the grounded junction point 110 of the assembly 130 will be in closer proximity to the surface of the structure to be monitored than the ungrounded junction point 118. As such, a comparison of measurements taken from both junctions 110 and 118 should exhibit a time lag. That is, the junction 110 should reach a stable temperature more quickly than the junction 118. If an expected time lag is observed, then the lag is an indication that the installation is proper. If the expected time lag is not observed or is shorter than expected, then comparison of the measurements from junctions 110 and 118 indicates that the installation was not properly performed and should be corrected.

In the embodiments shown, the presence of both grounded and ungrounded sensors facilitates performance of an insulation resistance test to measure the integrity of the insulation material 124, such as in accordance with the requirements of ASTM E585 and E780. In general, an insulation resistance on the order of 1 Gohm at 500 VDC at ambient temperature is acceptable to ensure the integrity of the temperature measurement provided by the junction points 110, 118. Lower insulation resistances (e.g., in the tens of Kohm range) can indicate the presence of moisture within the interior space of the sheath 102, which not only will affect the measurement, but can lead to corrosion of the conductors 106, 108, 114, 116 and ultimately failure of the temperature sensing assemblies 100, 130. Thus, the ability to measure insulation resistance at the time of manufacture and during use can provide useful information.

With reference to FIG. 6, when the assembly 100 or 130 is deployed, the insulation resistance measurement can be made by applying a DC voltage across the terminals 150 and 153 or across the terminals 152 and 153. The insulation resistance also can be measured by applying a DC voltage between terminals 150 and 146, terminals 150 and 148, terminals 152 and 146, and terminals 152 and 148. The measurement also can be made during use of the temperature sensing assembly 100, 130 in the field to check the integrity of the temperature measurements and/or to determine or predict whether a failure has or will occur.

The insulation resistance measurement also can be made at various points during the manufacturing/assembly process and before the temperature sensing assembly 100, 130 is deployed to the field.

For example, as shown in the flow diagram in FIG. 7, the temperature sensors 104 and 112 can be assembled in a mineral insulated sheath 102, the sheath 102 can be compacted and the junction point 110 can be welded to the sheath 102 or the mounting pad 132 at the desired temperature sensing location (block 702). A DC voltage (e.g., 500 VDC or other value appropriate for the particular assembly 100, 130) can then be applied between the thermocouple 112 (block 704), and the sheath 102 and the insulation resistance determined from an electrical measurement made between the temperature sensor 112 and sheath 102 (block 506). For example, the insulation resistance can be determined by measuring the electrical current flowing between the sensor 112 and the sheath 102 using appropriate instrumentation. If the determined insulation resistance is above a predetermined threshold (e.g., 10 Gohms or other value appropriate for the particular assembly 100, 130) (block 708), then the integrity of the assembly 100 or 130 can be deemed adequate and the assembly 100 or 130 can be accepted for further processing and/or deployment for use (block 710). Otherwise, the assembly 100, 130 can be rejected and discarded or reworked (block 712).

If the temperature assembly 100, 130 is accepted, then further assembly steps and/or deployment in the field can be performed. For example, as shown in the flow diagram of FIG. 8, an accepted temperature sensing assembly 100, 130 can be connected to a terminal box, such as the exemplary terminal box 140, via appropriate mechanical couplings and electrical connections (block 802). At this point, the insulation resistance can again be tested (or might be tested for the first time) by applying a DC voltage (e.g., 500 VDC or other appropriate value) between the thermocouple 112 and the sheath 102 (block 804). As an example, the voltage can be applied across the appropriate terminals of the terminal box 140. The insulation resistance of the assembly 100, 130 can then be determined based on measurement of an electrical parameter (e.g., current) between the terminals of the terminal box 140 (block 806). If the determined insulation resistance is below a threshold amount (e.g., 1 Gohm) (block 808), then, if the assembly 100, 130 has been deployed in the field, it should be replaced (block 810). Otherwise, the assembly 100, 130 can be used or continue to be used to monitor temperature in the field deployment (block 812). While in the field, measurements to determine insulation resistance can be made (block 814) to ensure the continued integrity of the assembly 100, 130 and the temperature measurements obtained therefrom. If at some point during the life of the assembly 100, 130 the determined insulation resistance falls below an acceptable threshold, then the assembly 100, 130 can be replaced (block 810) before it fails altogether.

In embodiments in which sensors 104 and 112 are thermocouples, the sensors 104, 112 can be the same type of thermocouple or different types. For example, both sensors 104 and 112 can be any one of Types K, J, E, T, S, R, B or N thermocouple; or sensor 104 can be a Type E thermocouple and sensor 112 can be a Type K thermocouples; or any other combination. Providing different types of thermocouples in the same assembly can be useful in a number of different manners. For example, the various types of thermocouples have different failure mechanisms, useful temperature ranges, and corrosion resistances. Some types of thermocouples are more readily available than others. Other types provide a higher output signal, while yet others are non-magnetic. Thus, as one example, an exemplary assembly 100 or 130 can include a Type K thermocouple and a Type E thermocouple. The Type K thermocouple has characteristics which make it more susceptible to corrosion, and consequently drift, at certain temperatures than a Type E thermocouple. The Type E thermocouple is non-magnetic and can provide a higher output signal than a Type K thermocouple. However, a Type K thermocouple is more readily available and, thus, may be less expensive to use. Of course, other types of combinations of types of thermocouples can be used in the assembly 100, 130 as may be best suited for the particular application in which the assembly 100, 130 is deployed.

Figure 9:
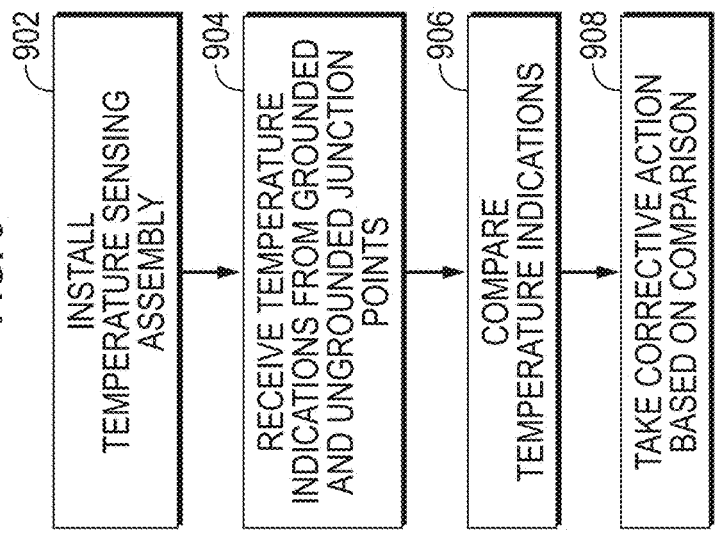
FIG. 9 is a diagram illustrating an exemplary technique for using information obtained from grounded and ungrounded temperature sensing points of the temperature sensing assembly to take a variety of corrective actions.

FIG. 9 is an exemplary flow diagram showing techniques for using information obtaining concurrently from both the grounded sensor 104 and the ungrounded sensor 112. At block 902, the temperature sensing assembly 100, 130 is installed to measure temperature of a process or of a surface of a structure. At block 904, measurements are obtained from both sensors 104 and 112. The measurements can be obtained concurrently, or at different times. At block 906, the measurements are compared. At block 908, corrective or remedial action is taken based on the comparison, if needed. For example, if the installation is relying on the measurement from the grounded sensor 104, then a large deviation in concurrent measurements between the grounded sensor 104 and the ungrounded sensor 112 may inform an operator that the measurement from sensor 104 is an anomaly and can be ignored. If the installation is relying on the measurement from the ungrounded sensor 112 and the comparison shows that the difference between the grounded and ungrounded measurements have changed over a period of time, then the operator can use the information to apply a correction factor to compensate for drift or other errors in the grounded measurement that have occurred over time. As yet another example, if the comparison does not show a time lag between measurements that are concurrently obtained after the installation has been performed, then the installer can correct the assembly of the temperature sensing assembly. Or the operator or installer can take any other actions that may be appropriate for the particular application in which the temperature sensing assembly is employed.

Various processes may be used to form the temperature sensing assemblies 100, 130. One exemplary methodology comprises extending the conductors 106, 108, 114, 116 into the interior of the sheath 102, welding the dissimilar conducting materials 106, 108 together at a junction point 110, welding the dissimilar conducting materials 114, 116 together at a junction point 118, and welding the junction point 110 to the sheath 102 or a mounting pad 132 at a desired location. The insulation 124 can initially be placed within the sheath 102 in the form of beads. The sheath 102 and insulation 124 can then be compacted (e.g., by drawing, swaging, etc.) 102 so that the insulation 124 fills the interstices between conductors 106, 108, 114, 116. At this point in the assembly, the insulation resistance can be measured by applying a DC voltage (e.g., 500 VDC) between the sheath 102 and a conductor 114, 116 as discussed above. The conductors 106, 108, 114, 116 of the temperature sensing assembly 100 can then be electrically coupled to appropriate terminals in the terminal box 140 and used to monitor temperature in the field.

In other embodiments of the invention, the assembly 100 can be a heater cable and one or more of the conductors 106, 108, 114, 116 may be configured as heating elements, where the length and the resistance of conductors 106, 108, 114 and/or 116 are selected to provide a desired Watts per foot for the particular application in which the heater cable is employed. Insulation resistance of the heater cable assembly then can be measured using the conductors 114, 116 in the manner discussed above.

While the invention has been disclosed with respect to a limited number of embodiments, those skilled in the art, having the benefit of this disclosure, will appreciate numerous modifications and variations therefrom. For example, the configurations and techniques described herein can be applied to test and measure the insulation resistance of any type of assembly in which one or more conductors are contained within a conductive sheath that is filled with an electrically insulative material. It is intended that the appended claims cover such modifications and variations as fall within the true spirit and scope of the invention.

What is claimed is:

1. A method of assembling a temperature sensing device, comprising:
   providing an electrically conductive sheath;
   disposing a first temperature sensor within an interior space of the conductive sheath to measure temperature of a process or a structure, the first temperature sensor comprising a first pair of dissimilar conductors that are joined to form a first temperature sensing point, the dissimilar conductors having free ends that extend from an open end of the conductive sheath;
   electrically connecting the first temperature sensing point to the conductive sheath;
   disposing a second temperature sensor within the interior space of the conductive sheath to measure temperature of the process or the structure, the second temperature sensor having a pair of free ends that extend from the open end of the conductive sheath;
   disposing an insulative material within the interior space of the conductive sheath about the first and second temperature sensors;
   applying a voltage between one of the free ends of the second temperature sensor and the conductive sheath; and
   determining an insulation resistance of the temperature sensing device based on the applied voltage.

2. The method as recited in claim 1, wherein if the determined insulation resistance is above a predetermined threshold, deploying the temperature sensing device to measure temperature of the process or the structure.

3. The method as recited in claim 1, further comprising compacting the conductive sheath and then applying the voltage between one of the free ends of the second temperature sensor and the conductive sheath and then determining the insulation resistance based on the applied voltage.

4. The method as recited in claim 1, wherein if the determined insulation resistance is below a predetermined threshold, discarding or reworking the temperature sensing device.

5. The method as recited in claim 4, wherein if the determined insulation resistance is above a predetermined threshold, then,
   coupling the temperature sensing device to a terminal box having terminals electrically connected to respective free ends of the first pair of dissimilar conductors and respective free ends of the second temperature sensor.

* * * * *